(12) United States Patent
Hogg

(10) Patent No.: US 6,602,341 B1
(45) Date of Patent: Aug. 5, 2003

(54) TREATING KAOLINITIC CLAYS

(75) Inventor: Christopher Stirling Hogg, Cornwall (GB)

(73) Assignee: Imerys Minerals Limited, Cornwall (GB)

( * ) Notice: Subject to any disclaimer, the term of this patent is extended or adjusted under 35 U.S.C. 154(b) by 0 days.

(21) Appl. No.: 09/914,228

(22) PCT Filed: Feb. 28, 2000

(86) PCT No.: PCT/GB00/00693

§ 371 (c)(1),
(2), (4) Date: Jan. 2, 2002

(87) PCT Pub. No.: WO00/50359

PCT Pub. Date: Aug. 31, 2000

(30) Foreign Application Priority Data

Feb. 26, 1999 (GB) ............................................. 9904363

(51) Int. Cl.$^7$ .......................... C04B 33/02; C04B 33/04
(52) U.S. Cl. ....................... 106/468; 106/467; 106/466; 106/486; 106/484; 106/DIG. 4; 501/141; 501/145; 501/149
(58) Field of Search ................................ 106/468, 467, 106/466, 486, 484, DIG. 4; 501/141, 145, 149

(56) References Cited

U.S. PATENT DOCUMENTS

| 4,042,412 | A | * | 8/1977 | Williams | 106/464 |
|---|---|---|---|---|---|
| 4,045,235 | A | * | 8/1977 | Bidwell et al. | 106/486 |
| 4,106,949 | A | * | 8/1978 | Malden | 106/486 |
| 4,929,580 | A | * | 5/1990 | Jones | 106/487 |
| 5,332,493 | A | * | 7/1994 | Ginn et al. | 106/486 |
| 5,593,490 | A | * | 1/1997 | Etheridge et al. | 106/416 |

FOREIGN PATENT DOCUMENTS

| EP | 0759334 | 2/1997 |
|---|---|---|
| GB | 1194866 | 6/1970 |
| GB | 1505233 | 3/1978 |

* cited by examiner

*Primary Examiner*—Michael Marcheschi
(74) *Attorney, Agent, or Firm*—Finnegan, Henderson, Farabow, Garrett & Dunner, L.L.P.

(57) ABSTRACT

A method of treating a kaolinitic clay which is intended for use as an ingredient in a ceramic composition which method comprises the steps of:

(a) mixing with the kaolinitic clay from 0.1% to 15.0% by weight, based on the dry weight of the kaolinitic clay, of a smectite clay; and (b) subjecting a mass in a moist plastic state of the clay mixture formed in step (a) to mechanical working under conditions such that there is dissipated in the moist plastic mass at least 5 kJ of energy per kilogram of clay mixture on a dry weight basis.

26 Claims, No Drawings

TREATING KAOLINITIC CLAYS

This invention is concerned with a method of treating kaolinitic clays, especially to improve the properties of such clays for use as ingredients for ceramic forming compositions, especially compositions which are to be used for preparing ceramic articles, eg whiteware articles such as tableware and the like.

Ceramic articles, eg tableware for use in the home and in the catering industry, are generally formed from a wet high solids composition which comprises a blend of various particulate ingredients which include kaolinitic clays, ie clays which contain the mineral kaolinite, such as kaolin or china clays and/or ball clays. Usually fluxing materials such as china stone, feldspar or nepheline syenite, and at least one silica-containing material, such as quartz or flint are also included in such compositions. If it is desired to produce articles of bone china, the composition will also contain a substantial proportion of ground, calcined animal bone, especially from cattle, or bone ash. The composition may also include minor proportions of other ingredients such as calcium carbonate, dolomite and talc. The proportions of the various ingredients used in the composition vary according to the properties required in the fired ceramic article. Many different types of ceramic tableware are roduced in various parts of the world, including, fine earthenware, semi-vitreous china, semi-vitreous porcelain, hotel china, household china, bone china, hard porcelain and stoneware.

Ceramic tableware articles are generally formed from the wet ceramic forming composition by a process which is based on the ancient technique of hand throwing on a potter's wheel. The technique of free-hand throwing is still used for shaping individual art pieces, but when a large number of substantially identical articles are required to be formed, a degree of automatic mechanisation is incorporated into the process. In this latter case, a mould of a suitable material, for example plaster or a synthetic resin, may be employed fixed to a wheel which is capable of high speed rotation in a horizontal plane. A suitable amount of the ceramic composition is then introduced onto or into this mould. If the mould is substantially convex, and is used for shaping, for example, the inside of a plate or dish, the process is widely known as "jiggering". If, however, the mould is concave, and is used for shaping the outside of a cup or jug, the term "jolleying" is often used. The second surface of the article, which is not in contact with the mould, is generally shaped by means of a profiling tool, most commonly of metal, which is brought into contact with this surface, whilst the article being shaped is rotated on the wheel. The shaping process has recently been rendered faster and more efficient through the introduction of roller head machines. In these machines the profiling tool is replaced by a heated rotating die, and both die and mould rotate continuously at appropriate speeds during the shaping of an article.

In order to perform satisfactorily in a shaping process, eg of the type described above, it is necessary for the ceramic forming composition to have sufficient plasticity to enable it to flow and deform under the action of compressive, tensile and shear stresses. The shaped article must also possess sufficient strength in its unfired or "green" state, to permit a certain amount of handling without loss of its integrity and shape. The green strength of a ceramic forming composition is generally determined by measuring the modulus of rupture (MOR) of dried extruded bars formed from the composition under certain standard conditions described later.

Some ceramic tableware is formed by a slip casting process. In this case the clays and other ingredients of the composition are mixed with a larger quantity of water, optionally with one or more additives, eg one or more dispersing agents, to form a fluid suspension, slurry or "slip". The slip is poured into a porous mould where a shaped article is formed by a process which is similar to that by which a filter cake is formed in a filter press. Partial dewatering of the shaped article occurs as water passes from the composition through the porous walls of the mould, until the article is sufficiently formed, in a dry and firm state, to be removed from the mould.

A further shaping process used for forming articles of ceramic tableware is that of dust pressing. In this process a ceramic composition in the form of an aqueous suspension containing a relatively high concentration of solid material, together with one or more dispersing agents for the solid material, is subjected to spray drying to form substantially dry hollow microspheres of diameter of the order of about 0.1 mm. A charge containing an appropriate quantity of these microspheres is introduced into a suitable mould to which pressure is applied to compact the charge to form the desired ceramic article. Again, when articles are formed by dust pressing, it is necessary for the ceramic composition to possess sufficient green strength to enable the shaped article to be handled without undue risk of breakage.

Subsequent to the shaping process, whatever shaping method is used, the shaped body produced in its green state is dried before firing one or more times to a suitable temperature in a kiln, to produce a ceramic article of the type desired. Glazes and decoration may also be applied at this stage.

An object of this invention is to improve the properties of kaolinitic clay components of ceramic forming compositions in order to increase the strength of green shaped articles formed from the compositions.

According to the present invention there is provided a method of treating a kaolinitic clay which is intended for use as an ingredient in a ceramic forming composition which method comprises the steps of (a) mixing with the kaolinitic clay from 0.1% to 15.0% by weight, based on the dry weight of the kaolinitic clay, of a smectite clay; and (b) subjecting a moist mass in a plastic state of the mixture formed in step (a) to mechanical working under conditions such that there is dissipated in the moist plastic mass at least 5 kJ of energy per kilogram of the clay mixture on a dry weight basis.

The amount of energy dissipated in step (b) may be in the range of from 5 kJ to 300 kJ of energy per kilogram of the clay mixture on a dry weight basis.

The kaolinitic clay used in step (a) may already have been subjected to known preliminary processing or refining steps, eg steps selected from degritting, washing, magnetic separation of impurities and one or more particle size separation steps.

The moist plastic state mass treated by mechanical working in step (b) preferably contains between 20% and 30% by weight of water.

The mixture of clays produced in step (a) may have a water content which is suitable for use in step (b). Alternatively, the water content of the clay after production may be adjusted to provide a suitable moist mass in a plastic, workable state. The water content adjustment may be by addition of an aqueous liquid or by concentration, depending on the water content of the mixture produced in step (a).

Where the clay mixture produced in step (a) is in the form of a dry powder the required moisture content may be adjusted simply by addition of water and mixing.

Where the clay mixture produced in step (a) is in the form of a dilute slurry or suspension the required moisture content may be obtained by one or more known dewatering processes, eg filtering and/or pressing and/or partial drying and/or adding already dried material, ie using a dry feedback or dry-return supply loop from a subsequent dryer output.

The kaolinitic clay used in step (a) may comprise one or more kaolin clays of primary or secondary origin. Kaolinitic clays were formed in geological times by the weathering of the feldspar component of granite. Primary kaolin clays are those which are found at the site at which they were formed, and are generally present in a matrix of undecomposed granite which must be separated from the clay during the refining process for the clay. Secondary kaolin clays, which are alternatively known as sedimentary kaolin clays, are those which were flushed out in geological times from the granite matrix in which they were formed, and were deposited in an area remote from their site of formation, generally in a basin formed in the surrounding strata. Kaolin clays are generally found in association with relatively small proportions of impurities, such as mica, feldspar, quartz, titanium compounds and the like, and may also include a trace of smectite clays. The kaolinitic clay may alternatively comprise one or more ball clays, or a mixture of one or more ball clays with one or more kaolin clays. Ball clays are sedimentary clays which are very finely divided, in that they have a particle size distribution such that the particles predominantly have an equivalent spherical diameter smaller than 2 $\mu$m. However, ball clays tend to have a higher proportion of impurities than kaolin clays, and to be less white in colour. The impurities present in ball clays may include significant proportions of fine silica, together with minor amounts of compounds of iron and titanium and also organic matter such as lignite.

Smectite clays are formed predominantly of smectite mineral particles which are sheet silicates with a high cation exchange capacity arising from charge imbalance due to substitutions within the crystal lattice. This charge imbalance is compensated by cations adsorbed from solution, known as exchangeable ions because they can easily be exchanged with ions of a different type. For most naturally occurring smectites, the exchangeable ion is a divalent cation, principally calcium, although a few smectites are found with a monovalent ion, principally sodium, as the exchangeable cation, notably smectites from Wyoming, USA.

In water, those smectites with divalent calcium cations disperse to a lesser degree than those with monovalent cations. This is due to the greater effect of the divalent cation in compressing the so-called electrostatic double layer around the particles that causes them to repel each other, compared with the monovalent cation.

Monovalent ion exchanged smectites are relatively easily dispersed in water to give individual plates or crystallites, whereas the divalent ion exchanged smectites tend only to disperse to "packets" or three or four crystallites. Monovalent ion exchanged smectites, especially sodium smectites, are generally more effective in user applications.

It is a relatively simple matter to convert a calcium smectite to a sodium smectite, by adding a small amount of a sodium ion containing solution, eg sodium carbonate, typically about 4% to 5% by weight. When dispersed in water, the exchangeable calcium ions are precipitated as calcium carbonate and the sodium ions become the exchangeable ions. The smectite is then said to be "sodium activated". However, the term "activated" should be used with caution, as smectites can also be "acid activated" for use in decolouring vegetable oils, which is an entirely different activation process.

In the method of the present invention, the smectite clay is preferably a montmorillonitic clay such as a bentonite, and preferably has a monovalent ion such as sodium as the predominant exchangeable cation. Such a clay can be prepared for example by activating a calcium bentonite with sodium carbonate. Other smectite clays such as hectorite, saponite and beidellite may be suitable for use in the method of the present invention.

The amount of the smectite clay mixed with the kaolinitic clay in the method of the invention is preferably in the range of from 0.5% to 7.0% by weight, based on the dry weight of the kaolinitic clay.

The smectite clay when added to the kaolinitic clay may be in the form of a powder or a slurry, ie an aqueous suspension. Likewise, the kaolinitic clay may be in powder or slurry form. The clays after being added together are preferably mixed thoroughly together for a period of time, eg at least 1 minute, preferably at least 2 minutes. Desirably, the mixture of the two clays is moist, eg contains at least 10% by weight water, in some cases from 10% to 90% by weight water, when the clays are being mixed together.

The clays may be mixed together in moist form in a mixing or compounding device. The individual clays may be added together on an inlet conveyer to such a device or conveyed separately for addition and mixing in the device.

In step (b) of the method of the invention, the water content of the treated moist plastic state mass is preferably from 23% to 28% by weight of water.

The mixture of clays may be treated by one or more additional procedures, in addition to any water content adjustment required, prior to step (b). For example, so called "tramp iron" or large pieces of iron may be removed prior to step (b) by a permanent magnet.

In step (b) of the method of the invention, the mechanical working may be exerted upon the plastic state mass by means of an extrusion device, such as an auger-type pug mill, a Z-blade mixer, an edge runner mill or a similar device known for working masses of particulate material in a moist plastic state. The device is preferably an auger-type pug mill, which is a known device, eg as described in GB1,194,866 the contents of which are incorporated by reference and is conveniently provided with known means for adjusting the size of the outlet nozzle(s) in order to control the throughput rate of material passing through the device, and the pressure built up inside the device, and thus the amount of energy dissipated in the plastic state clay mixture. The amount of energy dissipated in the plastic state mass is preferably in the range of from 10 kJ to 250 kJ, and most preferably from 20 kJ to 175 kJ, per kilogram of the clay mixture treated on a dry weight basis.

After treatment by steps (a) and (b) of the method of the invention, the resulting clay mixture product may optionally be further processed by one or more known refining processes.

The resulting product (with or without further processing) may be delivered to a user in wet slurry form or in dry powder form, eg by thermally drying the resulting product prior to delivery. The resulting product may be employed in the production of compositions to make ceramic articles in a known way, eg using one of the prior art methods described earlier.

The resulting product of the method according to the invention can, when extruded and dried in a standard manner, show an improved modulus of rupture and can also provide improved plasticity and higher solids castable compositions all of which are beneficial properties when the product is used in compositions for shaping to form ceramic articles. These benefits are demonstrated in the following Examples.

Embodiments of the present invention will now be described by way of example in the following Examples.

EXAMPLE 1

An English kaolin clay intended for use in the ceramic tableware industry was obtained having a particle size distribution such that 60% by weight consisted of particles having an equivalent spherical diameter smaller than 5 $\mu$m and 38% by weight consisted of particles having an equivalent spherical diameter smaller than 2 $\mu$m. Samples of the kaolin clay were prepared for treatment in a pug mill by being mixed with sufficient water to form a paste containing 25% by weight of water using a high speed mixer.

The samples were divided into two batches "A" and "B". To the samples in batch A in moist form there was added before treatment in the pug mill 1.5% by weight, based on the weight of dry kaolin clay, of a Wyoming sodium bentonite, while no bentonite was added to the samples in batch B.

Samples of batches A and B were then subjected to mechanical working in a pug mill of the kind described in GB 1,194,866 equipped with a pressure sensitive transducer and integrator to enable the energy dissipated in the clay to be calculated. The amount of energy dissipated could be varied either by selecting a larger or smaller outlet nozzle for the pug mill, or by passing the clay several times through the pug mill.

Samples of each of batch A and batch B were retained for testing without being subjected to mechanical working in the pug mill.

The samples of batch A and batch B passed through the pug mill experienced a range of different amounts of energy dissipated therein.

Each sample was then tested for modulus of rupture at 80% relative humidity by the method described as follows.

In order to measure the modulus of rupture, or green strength, of the kaolinitic clay, a sample of each batch of clay in the plastic state was extruded by means of a piston type extruder through a circular aperture to form a cylindrical rod of diameter 6 mm. The extruded rods were then cut into bars of length 150 mm. The bars were allowed to dry in the air, and were then dried at 60° C. in an oven, overnight. The bars were then cut in half and placed in a controlled atmosphere of 80% relative humidity for several hours, before being broken on a three-point flexure jig with a 50 mm span mounted on a universal testing machine or similar equipment. The diameters of the bars were measured at the point of fracture, and the modulus of rupture calculated from the diameter and the force required to break the bar. At least ten bars were tested in this way for each batch of clay, and the average modulus of rupture was calculated.

The results are set forth in Table 1 as follows in which individual samples are designated A1 . . . , B1 . . . , etc according to the batches A or B from which they were selected.

TABLE 1

| Sample | % by weight of added bentonite | Energy dissipated (kJ.kg$^{-1}$) | Modulus of rupture (MPa) |
|---|---|---|---|
| A1 | 1.5 | 0 | 0.882 |
| A2 | 1.5 | 63 | 1.226 |
| A3 | 1.5 | 114 | 1.344 |
| A4 | 1.5 | 161 | 1.569 |
| A5 | 1.5 | 230 | 1.500 |
| B1 | 0 | 0 | 0.490 |
| B2 | 0 | 53 | 0.922 |
| B3 | 0 | 98 | 0.951 |
| B4 | 0 | 151 | 1.069 |
| B5 | 0 | 206 | 1.059 |

The results in Table 1 show that the mechanical working of both batches A and B of kaolinitic clay caused the modulus of rupture to undergo modest increases. However, where 1.5% by weight of sodium bentonite was added to the kaolinitic clay for samples in batch A the modulus of rupture, unexpectedly and beneficially, was significantly increased. Table 1 shows that increase continued as the amount of energy dissipated in the mechanical working is increased until the amount of energy reached about 175 kJ.kg$^{-1}$. There was seen to be little benefit in increasing the amount of energy dissipated in the kaolinitic clay during the mechanical working step above about 175 kJ.kg$^{-1}$

EXAMPLE 2

A second English kaolin clay intended for use in the ceramic tableware industry had a particle size distribution such that 52% by weight consisted of particles having an equivalent spherical diameter smaller than 5 $\mu$m and 32% by weight consisted of particles having an equivalent spherical diameter smaller than 2 $\mu$m. Samples of this kaolin clay were subjected to working treatment in the same pug mill as was used in Example 1. Each sample of the kaolin clay was prepared for treatment in the pug mill by mixture with sufficient water to form a paste containing 25% by weight of water in a high speed mixer.

The samples were divided into two batches "C" and "D". To the samples in batch C there was added before treatment in the pug mill 0.9% by weight, based on the dry weight of the kaolin clay, of a Wyoming sodium bentonite, while no bentonite was added to the samples in batch D. Samples of each of batch C and batch D were retained for testing without being subjected to mechanical working in the pug mill. The remaining samples of batch C and batch D were passed through the pug mill under varying conditions, so that samples from each batch had a range of different amounts of energy dissipated therein.

Each sample was then tested for modulus of rupture as described in Example 1 above, and the results obtained are set forth in Table 2 as follows wherein the individual samples are designated C1 . . . , D1 . . . , etc according to the batch C or D from which they were obtained.

TABLE 2

| Sample | % by weight of added bentonite | Energy dissipated (kJ.kg$^{-1}$) | Modulus of rupture (MPa) |
|---|---|---|---|
| C1 | 0.9 | 0 | 0.892 |
| C2 | 0.9 | 79 | 1.275 |
| C3 | 0.9 | 95 | 1.344 |

TABLE 2-continued

| Sample | % by weight of added bentonite | Energy dissipated (kJ.kg$^{-1}$) | Modulus of rupture (MPa) |
|---|---|---|---|
| C4 | 0.9 | 190 | 1.589 |
| D1 | 0 | 0 | 0.706 |
| D2 | 0 | 37 | 0.892 |
| D3 | 0 | 77 | 0.991 |
| D4 | 0 | 135 | 1.069 |
| D5 | 0 | 278 | 1.177 |

The results in Table 2 show the same trends as observed in Example 1 (Table 1).

EXAMPLE 3

A blend of kaolinitic clays (batch E) was obtained which consisted of a mixture of two intermediate products from kaolin refining plants and the coarse fraction from a particle size separation process which produced coarse and fine fractions from an intermediate kaolin product. The blend had a particle size distribution such that 23% by weight consisted of particles having an equivalent spherical diameter larger than 10 μm and 25% by weight consisted of particles having an equivalent spherical diameter smaller than 2 μm. The blend was prepared by suspending each component clay in sufficient water to form a suspension containing 10% by weight dry clay, and mixing the suspensions in the proportions required to provide the required blend. The blended suspension thus formed was divided into six samples. To two of the six samples there was added 1% by weight of a montmorillonite derived from the kaolin producing area of Cornwall, England. To another two of the samples 2% by weight of the same montmorillonite was added. No montmorillonite was added to the remaining two samples of the suspension.

Each of the samples of the suspension was then dewatered by filtration to form a cake containing about 25% by weight of water. One of each pair of samples (Samples E1, E2 and E3) was reserved for testing for modulus of rupture as described in Example 1 earlier. The other Sample of each pair (Samples E4, E5 and E6) was subjected to mechanical working in a pug mill as described in Example 1, the conditions being such that the amount of energy dissipated in the clay mixture was in the region of about 165 kJ per kilogram of clay (on a dry weight basis). The samples which had been subjected to mechanical working were also tested for modulus of rupture.

The results are set forth in Table 3 below.

TABLE 3

| Sample | % by wt of added montmorillonite | Energy dissipated (kJ.kg$^{-1}$) | Modulus of rupture (MPa) |
|---|---|---|---|
| E1 | 0 | 0 | 0.374 |
| E2 | 1 | 0 | 0.452 |
| E3 | 2 | 0 | 0.451 |
| E4 | 0 | 159 | 0.735 |
| E5 | 1 | 143 | 0.814 |
| E6 | 2 | 164 | 1.138 |

These results show that the addition of a small amount of montmorillonite to the kaolinitic clay causes an increase in the green strength of the clay. When the samples of kaolinitic clay are subjected to mechanical working, the green strength is further substantially increased.

EXAMPLE 4

A kaolinitic clay (Sample F) which was an intermediate product from a kaolin refining plant had a particle size distribution such that 9% by weight consisted of particles having an equivalent spherical diameter larger than 10 μm and 57% by weight consisted of particles having an equivalent spherical diameter smaller than 2 μm. The clay was made available in the form of a relatively dilute aqueous suspension. The suspension of clay was divided into four portions. To three of the four portions there were added 1% by weight, 2% by weight and 3% by weight, respectively, of a bentonite derived from Texas. No bentonite was added to the other portion of clay.

Each portion of suspension was then dewatered by filtration to form a cake containing about 30% by weight of water. A fraction of this moist cake was removed and thermally dried and then mixed back into the remainder of the moist cake to decrease the water content to 22% by weight. Each portion of cake was then divided into two halves. One half of each portion (Samples F1–F4) was reserved for testing for modulus of rupture as described in Example 1 above. The other half (Sample F5–F8) was subjected to mechanical working in a pug mill as described in Example 1. The working conditions in the pug mill were such that the amount of energy dissipated in the kaolinitic clay mixture was about 40 kJ per kilogram of clay (on a dry weight basis) in the case of Samples F6 to F8, to which bentonite had been added, and about 100 kJ per kilogram (on a dry weight basis) in the case of Sample F5, which was free of bentonite. A further sample of the cake formed from the portion of the suspension which had not been treated with bentonite (Sample F9) was subjected to mechanical working in the pug mill under conditions such that about 230 KJ per kilogram of energy was dissipated therein. The portions of clay which had been subjected to mechanical working were also tested for modulus of rupture.

The results are set forth in Table 4 as follows.

TABLE 4

| Sample | % by wt of added bentonite | Energy dissipated (kJ.kg$^{-1}$) | Modulus of rupture (MPa) |
|---|---|---|---|
| F1 | 0 | 0 | 0.314 |
| F2 | 1 | 0 | 0.559 |
| F3 | 2 | 0 | 0.716 |
| F4 | 3 | 0 | 0.912 |
| F5 | 0 | 97.2 | 0.392 |
| F6 | 1 | 46.8 | 0.647 |
| F7 | 2 | 39.6 | 0.853 |
| F8 | 3 | 32.4 | 1.001 |
| F9 | 0 | 230.4 | 0.461 |

A desirable minimum value for the modulus of rupture for a kaolinitic clay for inclusion in a ceramic tableware would be about 0.6 MPa, and it is seen from the results in Table 4 that a clay product of acceptable green strength can be obtained when 1% by weight of bentonite, based on the weight of kaolinitic clay on a dry weight basis, is mixed with the starting kaolinitic clay, and the mixture is then subjected to mechanical working under conditions such that about 40 kJ of energy per kilogram of dry clay mixture is dissipated in the mixture. In the absence of mechanical working, it is necessary to add twice as much bentonite to achieve comparable results. If no bentonite is added, an acceptable product is not obtained, even if 230 kJ of energy per kilogram of dry clay is dissipated in the clay.

EXAMPLE 5

A kaolinitic clay G which was a product from a kaolin refining plant had a particle size distribution such that 1.1% by weight consisted of particles having an equivalent spherical diameter larger than 10 μm and 73% by weight consisted of particles having an equivalent spherical diameter smaller than 2 μm. The clay was made available in the form of a relatively dilute aqueous suspension. This suspension was dewatered in a filterpress and the water content of the cake was adjusted to 28% by weight by mixing with the moist cake an appropriate amount of the cake which had been thermally dried. The cake thus formed was divided into four parts which were mixed with respectively no bentonite and 1%, 2% and 3% by weight of bentonite, based on the weight of dry kaolinitic clay. The bentonite was the same as that used in Example 4. The cake which contained no bentonite was divided further into four samples. One sample (Sample G1) was dried and tested for modulus of rupture at 80% relative humidity as described in Example 1 earlier. The remaining three samples of this cake (Samples G2–G4) were subjected to mechanical working under conditions which provided for progressively increasing amounts of energy to be dissipated in the cake. These samples were then dried and tested for modulus of rupture at 80% relative humidity.

The portions of cake which contained 1% and 3%, respectively, by weight of added bentonite were each divided into two portions. Samples of each (Samples G5 and G11) were dried and tested for modulus of rupture at 80% relative humidity without further treatment, while the other samples of each (Samples G6 and G12) were subjected to mechanical working under conditions such that about 80 to 95 kJ of energy per kilogram of dry clay was dissipated in the cake. These samples also were then dried and tested for modulus of rupture at 80% relative humidity. The portion of cake which contained 2% by weight of bentonite was further divided into four samples, one of which (Sample G7) was dried and tested for modulus of rupture at 80% relative humidity without further treatment. The remaining three samples of this portion (Samples G8–G10) were subjected to mechanical working under conditions which provided for progressively increasing amounts of energy to be dissipated in the cake. These samples also were then dried and tested for modulus of rupture at 80% relative humidity.

The results are set forth in Table 5 as follows.

TABLE 5

| Sample | % by wt of added bentonite | Energy dissipated (kJ.kg$^{-1}$) | Modulus of rupture (MPa) |
| --- | --- | --- | --- |
| G1 | 0 | 0 | 0.608 |
| G2 | 0 | 61.2 | 0.853 |
| G3 | 0 | 118.8 | 1.030 |
| G4 | 0 | 172.8 | 0.873 |
| G5 | 1 | 0 | 0.765 |
| G6 | 1 | 93.6 | 1.020 |
| G7 | 2 | 0 | 0.932 |
| G8 | 2 | 61.2 | 1.246 |
| G9 | 2 | 104.4 | 1.273 |
| G10 | 2 | 176.4 | 1.294 |
| G11 | 3 | 0 | 1.089 |
| G12 | 3 | 82.8 | 1.472 |

The aim of this Example was to provide a kaolinitic clay having an exceptionally high modulus of rupture of about 1.27 MPa. It can be seen from Table 5 that this can be achieved if 2% by weight of bentonite is mixed with the kaolinitic clay and the mixture is then subjected to mechanical working under conditions such that at least about 100 kJ of energy per kilogram of clay mixture on a dry weight basis is dissipated in the cake of clay. Alternatively 3% by weight of bentonite may be incorporated into the kaolinitic clay, and the minimum amount of energy to be dissipated in the cake may be reduced.

EXAMPLE 6

A low solids slurry (<30% by weight solids in water) of a casting kaolin composition was obtained. This is designated S1. To a portion of the material S1 was added 0.3% by weight (based on the dry weight of clay present) of bentonite (BTM) in the form of a dilute suspension in water. The bentonite was thoroughly mixed into the casting kaolin suspension. The resulting material was concentrated to provide a material comprising a wet plastic mass designated S3. The original material S1 without bentonite addition was also concentrated by the same amount to produce a material S2.

The materials S2 and S3 were treated by working in a pug mill as used in Example 1 at different energy dissipation rates. The modulus of rupture (MOR) was measured at 80% RH as described in Example 1. The results obtained are given in Tables 6 and 7 follows.

TABLE 6

Results for material S2 (no bentonite)

| Working energy (kW.kJ$^{-1}$) | MOR at 80% RH (MPa) |
| --- | --- |
| 0 | 0.91 |
| 15 | 1.21 |
| 28 | 1.37 |
| 38 | 1.41 |
| 60 | 1.50 |

TABLE 7

Results for material S3 (0.3% added bentonite)

| Working energy (kW.kJ$^{-1}$) | MOR at 80% RH (MPa) |
| --- | --- |
| 0 | 0.97 |
| 22 | 1.52 |
| 42 | 1.69 |
| 72 | 2.05 |

These results show the same beneficial trends as in the earlier Examples.

EXAMPLE 7

A partially refined kaolinitic clay H of primary origin had a particle size distribution such that 36% by weight consisted of particles having an equivalent spherical diameter larger than 10 μm and 26% by weight consisted of particles having an equivalent spherical diameter smaller than 2 μm. A dilute aqueous suspension containing the partially refined kaolin was dewatered in a filterpress and the water content of the resulting cake was adjusted to 25% by weight by mixing with the moist cake an appropriate amount of the cake which had been thermally dried. The cake thus formed was divided into four parts which were mixed with respectively no bentonite and 3%, 6% and 10% by weight of bentonite, based on the weight of kaolinitic clay on a dry weight basis. The bentonite was the same as that used in Example 4. The portion of cake which contained no bentonite was divided further into four portions. One portion (Sample H1) was dried and tested for modulus of rupture at 80% relative humidity as described in Example 1. The remaining three portions of this batch (Samples H2, H3 and H4) were subjected to mechanical working under conditions which provided for progressively increasing amounts of energy to be dissipated in the cake. These samples were then dried and tested for modulus of rupture at 80% relative humidity.

The portions of cake which contained 3%, 6% and 10%, respectively, by weight of bentonite (Samples H5, H6 and H7) were subjected to mechanical working under conditions such that about 195 kJ to 220 kJ of energy per kilogram of clay (on a dry weight basis) was dissipated in the cake. These samples also were then dried and tested for modulus of rupture at 80% relative humidity.

The results are set forth in Table 8 as follows.

TABLE 8

| Sample | % by wt of added bentonite | Energy dissipated (kJ.kg$^{-1}$) | Modulus of rupture (MPa) |
|---|---|---|---|
| H1 | 0 | 0 | 0.638 |
| H2 | 0 | 43.2 | 0.736 |
| H3 | 0 | 140.4 | 0.716 |
| H4 | 0 | 216.0 | 0.814 |
| H5 | 3 | 198.0 | 2.060 |
| H6 | 6 | 205.2 | 3.855 |
| H7 | 10 | 219.6 | 3.473 |

The results in Table 8 show that, in the case of this particular kaolin clay, the green strength appears to reach a maximum when about 6% by weight of bentonite is mixed with the kaolinitic clay, and the mixture is then subjected to mechanical working in the plastic state. Mechanical working in the absence of bentonite appears to produce only an unduly small increase in modulus of rupture.

EXAMPLE 8

A refined kaolinitic clay I, which was prepared by passing Sample H through a hydraulic cyclone of diameter 50 mm and selecting the overflow fraction, had a particle size distribution such that 10% by weight consisted of particles having an equivalent spherical diameter larger than 10 $\mu$m and 43% by weight consisted of particles having an equivalent spherical diameter smaller than 2 $\mu$m. A dilute aqueous suspension containing the partially refined kaolin was dewatered in a filterpress and the water content of the cake was adjusted to 25% by weight by mixing with the moist cake an appropriate amount of the cake which had been thermally dried. The cake thus formed was divided into four parts which were mixed with respectively no bentonite and 3%, 6% and 10% by weight of bentonite, based on the dry weight of kaolinitic clay. The bentonite was the same as that used in Example 4. The portion of cake which contained no bentonite was divided further into four portions. One portion (Sample I1) was dried and tested for modulus of rupture at 80% relative humidity as described in Example 1. The remaining three portions of this batch (Samples I2, I3 and I4) were subjected to mechanical working under conditions which provided for progressively increasing amounts of energy to be dissipated in the cake. These samples were then dried and tested for modulus of rupture at 80% relative humidity.

The portions of cake which contained 3%, 6% and 10%, respectively, by weight of bentonite (Samples I5, I6 and I7) were subjected to mechanical working under conditions such that about 195 kJ to 220 kJ of energy per kilogram of clay (on a dry weight basis) was dissipated in the treated cake. These samples also were then dried and tested for modulus of rupture at 80% relative humidity.

The results are set forth in Table 9 as follows.

TABLE 9

| Sample | % by wt of added bentonite | Energy dissipated (kJ.kg$^{-1}$) | Modulus of rupture (MPa) |
|---|---|---|---|
| I1 | 0 | 0 | 0.667 |
| I2 | 0 | 50.4 | 1.069 |
| I3 | 0 | 129.6 | 1.285 |
| I4 | 0 | 212.4 | 1.285 |
| I5 | 3 | 216.0 | 2.296 |
| I6 | 6 | 205.2 | 3.090 |
| I7 | 10 | 237.6 | 4.110 |

The results in Table 9 show that, in the case of particular kaolin clay, the green strength appears to continue increasing with the weight percentage of bentonite added, even when the amount of bentonite is as high as 10% by weight, based on weight of dry kaolinitic clay. Again, mechanical working in the absence of bentonite appears to produce only a small increase in modulus of rupture.

EXAMPLE 9

A feed clay comprising a partially refined kaolin clay was obtained. The feed clay had a particle size distribution such that 39% by weight had an equivalent spherical diameter (esd) greater than 10 $\mu$m and 26% by weight had an esd less than 2 $\mu$m. The feed clay had a $Fe_2O_3$ impurity content of 0.21% by weight and a $K_2O$ impurity content of 1.69% by weight.

Experiments were carried out in which the effect was investigated of adding 3% by weight (based on the dry weight of kaolin clay present) of a powdered Texas bentonite, treated to be sodium activated, to the feed clay with and without subsequent mechanical working. The moisture content of the feed clay was adjusted to 10% by weight prior to addition of the bentonite. The bentonite when added was thoroughly mixed with the moist feed clay for a period of 5 minutes. In the case where mechanical working was applied this was carried out by adjusting the moisture content to about 25% by weight by addition of water and treating the resulting mass in a plastic state by extrusion using an energy input of 55 kJ.kg$^{-1}$ in a pug mill. The following properties were observed or measured for the three clay samples obtained (ie feed clay, Sample X, feed clay plus bentonite, Sample Y, and feed clay plus bentonite plus working in a pug mill, Sample Z): plasticity, modulus of rupture (MOR) (measured as in Example 1) and maximum castable solids concentration. For MOR measurements, extruded rods, after drying in an oven at 60° C., are either placed in a conditioning cabinet with an atmosphere of 80% relative humidity (80% RH) until they reach a moisture equilibrium or fully dried in an oven at 110° C. These two sets of "conditioned" bars are then tested for modulus of rupture as described in Example 1. Plasticity and casting concentration were also measured. Plasticity was graded according to the quality of crack-free bendability of the sample as observed by an experienced operator. The casting concentration was measured by a standard method employed by the Applicant to measure the casting concentration of a kaolinitic clay for use in a ceramic casting composition. This method is as follows. 250 g of the kaolinitic clay which has been dried at 60° C. to a water content of less than 1% by weight and crushed to pass through a sieve of aperture size 2 mm is added to deionised water. The amount of water used is based on an estimation of the expected casting concentration, and only gentle hand stirring is used to prepare the mixture. As the clay is added to the water, the mixture eventually becomes too viscous to stir and P84 grade sodium silicate, which has been diluted to 50% wt/vol, is run into the mixture from a burette as a dispersing agent. The sodium silicate is added in increments of 0.2 ml and the mixture is stirred by hand after each increment. Five minutes after each increment, the viscosity of the mixture is determined by means of a Brookfield Viscometer using Spindle No 3 at 20 rpm. The procedure of adding an increment of the sodium silicate and measuring the viscosity of the mixture is repeated until a minimum value of the viscosity has been reached, which should be greater than 500 mPa·s if the initial quantity of water used was correctly estimated. Deionised water is then added until the measured viscosity has fallen to 500 mPa·s. A sample is then taken from the clay suspension, weighed, dried and reweighed to determine the percentage by weight of dry clay in the suspension. This percentage by weight is recorded as the casting concentration of the suspension. The results are given in Table 10 as follows.

TABLE 10

|  | Sample X | Sample Y | Sample Z |
| --- | --- | --- | --- |
| Bentonite Addition wt % | 0 | 3 | 3 |
| Working Energy kW.kJ$^{-1}$ | 0 | 0 | 55 |
| Modulus of Rupture (MOR) (MPa) | | | |
| 80% RH | 0.64 | 0.93 | 2.06 |
| 110° C. | 1.32 | 2.37 | 4.57 |
| Plasticity | Very Poor | Very Poor | Good |
| Casting Data | | | |
| % solids | 62.7 | 58.6 | 64.9 |

Table 10 shows that the addition of bentonite to the feed clay substantially increased MOR at 80% RH and also when dried to 110° C.

The addition of bentonite followed by mechanical working in the pug mill gave significant increases in both strength (MOR) at both 80% RH and drying to 110° C. and also in plasticity. Also casting concentration was improved.

What is claimed is:

1. A method of treating a kaolinitic clay which is intended for use as an ingredient in a ceramic composition which method comprises the steps of:
    (a) mixing with the kaolinitic clay from 0.1% to 15.0% by weight, based on the dry weight of the kaolinitic clay, of a smectite clay; and
    (b) subjecting a mass in a moist plastic state of the clay formed in step (a) to mechanical working under conditions such that there is dissipated in the moist plastic mass at least 5 kJ of energy per kilogram of clay mixture on a dry weight basis.

2. A method according to claim 1, wherein the plastic state mass treated in step (b) has a water content in the range of from 20% to 30% by weight water.

3. A method according to claim 2, wherein the water content of the plastic state mass treated in step (b) is in the range from 23% to 28% by weight water.

4. A method according to claim 1, wherein the clay mixture produced in step (a) has a water content.

5. A method according to claim 1, wherein in step (b) the energy dissipated is from 5 kJ to 300 kJ per kilogram of clay mixture on a dry weight basis.

6. A method according to claim 1, wherein the kaolinitic clay is chosen from at least one of kaolin clays and ball clays.

7. A method according to claim 1, wherein the smectite clay comprises a montmorillonite clay.

8. A method according to claim 7, wherein the montmorillonite clay comprises a monovalent ion activated bentonite.

9. A method according to claim 1, wherein the amount of smectite clay added in step (a) is in the range of from 0.5% to 7% by weight based on the dry weight of the kaolinitic clay present.

10. A method according to claim 1, wherein in step (a) at least one of the kaolinitic clay and the smectite clay is in the form of a slurry.

11. A method according to claim 1, wherein the clay mixture formed in step (a) is in the form of a dilute aqueous suspension and the dilute aqueous suspension is dewatered prior to the working step (b).

12. A method according to claim 11, wherein the dewatering is carried out by one or more of filtering, pressing, partial drying and adding already dried material from a subsequent dryer output.

13. A method according to claim 1, wherein the working step (b) is carried out using an extrusion device.

14. A method according to claim 13, wherein the extrusion device comprises an auger type pug mill.

15. A kaolinitic clay product made by the method claimed in claim 1.

16. A composition for production of a ceramic article by a process including the steps of shaping, drying and firing, which composition incorporates a kaolinitic clay product according to claim 15.

17. A method according to claim 4, wherein the water content of the clay mixture produced in step (a) is between 10% and 90% by weight water.

18. A method according to claim 5 wherein in step (b) the energy dissipated is from 20 kJ to 175 kJ per kilogram of clay mixture on a dry weight basis.

19. A kaolinitic clay product made by the method of claim 8.

20. A method according to claim 9 wherein the amount of smectite clay added in step (a) is in the range of from 0.9% to 3% by weight based on the dry weight of the kaolinitic clay present.

21. A method of treating a kaolinitic clay which is intended for use as an ingredient in a ceramic composition which method comprises the steps of:
    (a) mixing with the kaolinitic clay from 0.5% to 7% by weight, based on the dry weight of the kaolinitic clay, of a monovalent ion exchanged smectite clay; and
    (b) subjecting a mass of the clay mixture formed in step (a) having a water content in the range from 20% to 30% by weight water, to mechanical working under conditions such that there is dissipated in the mass of the clay mixture from 20 kJ to 175 kJ of energy per kilogram of clay mixture on a dry weight basis.

22. A kaolinitic clay product made by the method of claim 21.

23. A method according to claim 1, wherein the resultant treated kaolin clay is incorporated into a composition, which is then used in the production of a ceramic article.

24. A method according to claim 23, wherein the production of said ceramic article comprises shaping, drying, and firing said composition.

25. A method according to claim 21, wherein the resultant treated kaolin clay is incorporated into a composition, which is then used in the production of a ceramic article.

26. A method according to claim 25, wherein the production of said ceramic article comprises shaping, drying, and firing said composition.

* * * * *

UNITED STATES PATENT AND TRADEMARK OFFICE
CERTIFICATE OF CORRECTION

PATENT NO. : 6,602,341 B1
DATED : August 4, 2003
INVENTOR(S) : Hogg

It is certified that error appears in the above-identified patent and that said Letters Patent is hereby corrected as shown below:

Column 14,
Line 11, "claim 1," should read -- claim 10, --.

Signed and Sealed this

Sixth Day of January, 2004

JAMES E. ROGAN
*Director of the United States Patent and Trademark Office*